US012725407B2

(12) United States Patent
Han et al.

(10) Patent No.: US 12,725,407 B2
(45) Date of Patent: Sep. 1, 2026

(54) LIGHT BACKDOOR ATTACK METHOD IN PHYSICAL WORLD

(71) Applicants: Hangzhou City University, Hangzhou (CN); Zhejiang Gongshang University, Hangzhou (CN); Zhejiang University, Hangzhou (CN)

(72) Inventors: Song Han, Hangzhou (CN); Siqi Ren, Hangzhou (CN); Haibo Hong, Hangzhou (CN); Shuai Zhao, Hangzhou (CN); Jin Yi, Hangzhou (CN); Lu Zhou, Hangzhou (CN); Shouling Ji, Hangzhou (CN); Shui Yu, Hangzhou (CN)

(73) Assignees: Hangzhou City University, Hangzhou (CN); Zhejiang Gongshang University, Hangzhou (CN); Zhejiang University, Hangzhou (CN)

(*) Notice: Subject to any disclaimer, the term of this patent is extended or adjusted under 35 U.S.C. 154(b) by 311 days.

(21) Appl. No.: 18/401,705

(22) Filed: Jan. 1, 2024

(65) Prior Publication Data

US 2024/0404252 A1 Dec. 5, 2024

(30) Foreign Application Priority Data

Jun. 2, 2023 (CN) ........................ 202310652261.0

(51) Int. Cl.
*G06V 10/774* (2022.01)
*G06V 10/764* (2022.01)

(52) U.S. Cl.
CPC .......... *G06V 10/774* (2022.01); *G06V 10/764* (2022.01)

(58) Field of Classification Search
CPC .... G06V 10/774; G06V 10/764; G06V 10/82; G06N 3/08
USPC ................ 382/159, 104, 157, 224; 348/148; 701/117; 706/16
See application file for complete search history.

(56) References Cited

U.S. PATENT DOCUMENTS

| | | | | |
|---|---|---|---|---|
| 2019/0318099 | A1* | 10/2019 | Carvalho | G06F 21/577 |
| 2020/0410098 | A1* | 12/2020 | Kolouri | G06V 10/82 |
| 2021/0019399 | A1* | 1/2021 | Miller | G06F 21/554 |
| 2021/0081718 | A1* | 3/2021 | Angel | G06N 3/08 |
| 2021/0256125 | A1* | 8/2021 | Miller | G06F 21/577 |
| 2021/0374247 | A1* | 12/2021 | Sultana | G06F 21/57 |
| 2022/0027462 | A1* | 1/2022 | Jiang | G06N 3/0464 |

(Continued)

OTHER PUBLICATIONS

T. Gu, K. Liu, B. Dolan-Gavitt and S. Garg, "BadNets: Evaluating Backdooring Attacks on Deep Neural Networks," in IEEE Access, vol. 7, pp. 47230-47244, 2019. (Year: 2019).*

*Primary Examiner* — Kathleen Y Dulaney
(74) *Attorney, Agent, or Firm* — Hemisphere Law, PLLC

(57) ABSTRACT

Provided is a light backdoor attack method for a physical world. The method includes: generating, by a flashlight, a light trigger on a traffic sign; capturing and acquiring, by a camera, a backdoor training set, and marking all images in the backdoor training set as a target label; constructing a training set according to the backdoor training set and a clean training set; training a backdoor model using the training set to obtain a trained backdoor model; and evaluating effectiveness of light backdoor attack by applying the trained backdoor model to a testing set. The method can poison DNNs to achieve a more covert backdoor attack and provide a new idea for physical backdoor attack field.

6 Claims, 5 Drawing Sheets

(56) References Cited

U.S. PATENT DOCUMENTS

2022/0053005 A1* 2/2022 Liu ...................... G06V 10/454
2022/0100850 A1* 3/2022 Sun ........................ G06N 20/00
2022/0114259 A1* 4/2022 Ludwig .................... G06N 5/04
2022/0292185 A1* 9/2022 Andreina ............. G06N 3/0464
2022/0398325 A1* 12/2022 Nguyen ................ G06F 21/577

* cited by examiner

LIGHT BACKDOOR ATTACK METHOD IN PHYSICAL WORLD

TECHNICAL FIELD

The present disclosure belongs to the field of artificial intelligence security, and in particularly relates to a training method for physical light backdoor attacks for artificial intelligence security.

BACKGROUND

Deep neural networks (DNNs) have been shown to be vulnerable to backdoor attacks. Most existing backdoor attacks focus on the digital domain. Some recent works have further improved the stealthiness of backdoor attacks by using physical objects as triggers. However, in some cases, it is difficult for attackers to directly access the target object to implement trigger deployment, and directly deploying trigger on the target object is not covert, which may raise suspicion.

SUMMARY

The purpose of the present disclosure is to provide a training method for physical light backdoor attacks for artificial intelligence security to solve the problems of the prior art described above.

To achieve the above, the present disclosure provides a training method for physical light backdoor attacks for artificial intelligence security, including:

performing a light backdoor attack on the target object, generating a corresponding light trigger on the target object based on the light color, generating backdoor image based on said light trigger;

acquiring an clean image, constructing separate training sets based on said backdoor image and said clean image; said clean image being the original images without light triggers generated;

constructing a backdoor model, where said backdoor model is a deep learning model, and training said backdoor model based on said training set to obtain a trained backdoor model;

constructing a testing set, evaluating said trained backdoor model based on said testing set, and obtaining attack success rate data and clean accuracy data for the light backdoor attack.

In an embodiment, said light trigger includes blue, green, red three colors.

In an embodiment, the process of generating said backdoor image comprises:

After generating a light trigger on the target object, the target object on which said light trigger is generated is photographed by the camera to obtain said backdoor image.

In an embodiment, said clean image is a CTSRD traffic sign dataset that has not been attacked by light backdoor triggers.

Use the camera to shoot and obtain the backdoor training set and mark all the images in the backdoor training set as target labels.

The process of constructing said training set includes:

using said backdoor image as a backdoor training set $X_b$ and labeling all images in said backdoor training set $X_b$ as target labels, using said clean image as a clean training set $X_c$, and performing a combined analysis of said clean training set $X_c$ and backdoor training set $X_b$ to obtain said training set $X_p$;

where the formula for obtaining said training set is:

$$X_p = X_b \cup X_c.$$

Optionally, said trained backdoor model $f_\theta$ is:

$$f_\theta(x) = y,$$

$$f_\theta(T_p) = y'$$

$$T_p(x_i, t_p, m_i) = (1 - m_i) \cdot x_i + m_i \cdot t_p.$$

Where $T_p$ is the backdoor image, $t_p$ is the backdoor trigger, $x_i$ is the clean image, $m_i$ is the percentage of the trigger in the image, $m_i \in [0,1]$, x is the clean image, y is the clean label, and y' is the backdoor label.

In an embodiment, said testing set is the image after brighten, darken and noise addition.

In an embodiment, said process of evaluating said trained backdoor model comprises:

Evaluating said trained backdoor model based on said testing set, obtaining clean accuracy data by calculating the classification accuracy of the clean testing set $X_c$; and obtaining attack success rate data by calculating the ratio of backdoor testing sets $X_p$ incorrectly classified as said target labels to all backdoor testing sets $X_b$.

The technical effects of the present disclosure are as follows.

The present disclosure provides a training method for a physical light backdoor attack for artificial intelligence security by performing a light backdoor attack on a target object, further generating a light trigger on the target object, obtaining backdoor image based on said light trigger; obtaining clean image, constructing a training set based on said backdoor image and said clean image; constructing a backdoor model, where said backdoor model is a deep learning model, training said backdoor model based on said training set to obtain a trained backdoor model; constructing a testing set, evaluating said trained backdoor model based on said testing set to obtain attack success rate data and clean accuracy rate data of the light backdoor attack.

The method of light backdoor attack provided by the present disclosure solves the current problem of physical backdoor attacks: no direct access to the target object is required to implement the deployment of the trigger. In addition, the attacker can initiate the attack when needed, which makes the method of the present disclosure more flexible and stealthy in launching backdoor attacks. The present disclosure achieves a more stealthy physical backdoor attack while having a high attack success rate.

BRIEF DESCRIPTION OF DRAWINGS

To describe the embodiments of the present disclosure or the technical solutions in the prior art more clearly, the accompanying drawings required in the embodiments are briefly introduced below. Obviously, the accompanying drawings described below are only some embodiments of the present disclosure. A person of ordinary skill in the art may further obtain other accompanying drawings based on these accompanying drawings without creative labor.

DETAILED DESCRIPTION OF EMBODIMENTS

The various exemplary embodiments of the present disclosure are now explained in detail. This detailed explanation should not be considered as a limitation of the present disclosure, but should be understood as a more detailed description of certain aspects, features, and implementation schemes of the present disclosure.

It should be understood that the terms mentioned in this disclosure are only intended to describe specific embodiments and are not intended to limit this disclosure. In addition, for the numerical range in this disclosure, it should be understood that each intermediate value between the upper and lower limits of the range is also specifically disclosed. Each smaller range between any stated value or intermediate value within the stated range, as well as any other stated value or intermediate value within the stated range, is also included in this disclosure. The upper and lower limits of these smaller ranges can be independently included or excluded from the range.

Figure 1:
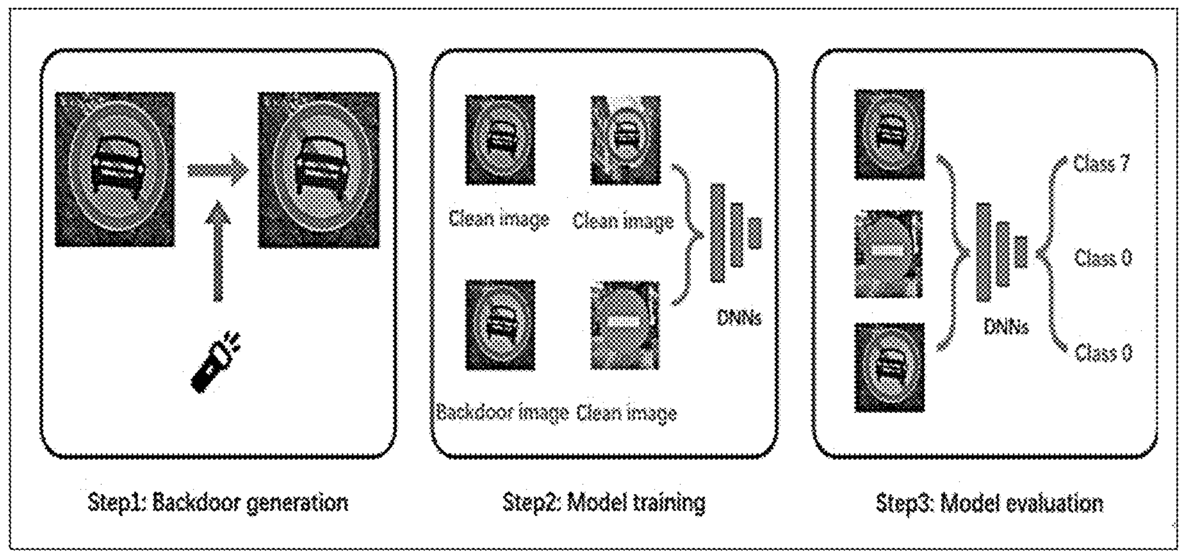
FIG. 1 shows the general flow chart of the image classification experiment of the present disclosure.

Unless otherwise stated, all technical and scientific terms used in this article have the same meanings as those commonly understood by conventional technical personnel in the field described in this disclosure. Although this disclosure only describes preferred methods, any methods similar or equivalent to those described herein can also be used in the implementation or testing of this disclosure. All literature mentioned in this manual is incorporated by reference to disclose and describe methods related to the literature. In case of conflict with any incorporated literature, the content of this manual shall prevail. The overall flow chart of the present disclosure is shown in FIG. 1, which includes the following 3 steps: generate backdoor images, backdoor model training, and backdoor model evaluation.

Without departing from the scope or spirit of the present disclosure, it is evident to those skilled in the art that various improvements and variations can be made to the specific embodiments of the present disclosure specification. The other embodiments obtained from the specification of the present disclosure are apparent to technical personnel. The present application specification and embodiments are only illustrative.

It should be noted that in the absence of conflicts, the embodiments and the features in the embodiments in this application can be combined with each other. The present application will be explained in detail below with reference to the accompanying drawings and in conjunction with embodiments.

As shown in FIGS. 1-6, this embodiment provides a training method for physical light backdoor attacks targeting artificial intelligence security, including:

Conduct a light backdoor attack on the target object, generate a corresponding light trigger based on the light color on the target object, and generate backdoor image based on the light trigger;

Obtain clean image and construct training sets based on the backdoor image and the clean image respectively; The clean image is the original image without generating a light trigger;

Construct a backdoor model, where the backdoor model is a deep learning model, and train the backdoor model based on the training set to obtain the trained backdoor model;

Build a testing set, evaluate the trained backdoor model based on the testing set, and obtain the attack success rate data and clean accuracy rate data of the light backdoor attack.

Use a flashlight to generate a light trigger on a traffic sign, which includes three different colors: blue, green, and red.

Use a camera to capture and obtain the backdoor training set, and label all images in the backdoor training set as target labels.

Build a training set $X_p$, which includes a backdoor training set $X_b$ and a clean training set $X_c$, namely:

$$X_p = X_b \cup X_c,$$

The backdoor image can be defined as:

$$T_p(x_i, t_p, m_i) = (1 - m_i) \cdot x_i + m_i \cdot t_p.$$

Among them, $T_p$ is the backdoor image, $t_p$ is the backdoor trigger, $x_i$ is a clean image, $m_i$ used to represent the proportion of the trigger in the image. $m_i \in [0,1]$.

Train the backdoor model $f_\theta$ using the training set $X_p$. A successfully trained backdoor model should correctly classify clean images, but misclassify backdoor images. Namely:

$$f_\theta(x) = y,$$

$$f_\theta(t_p) = y'$$

Among them, x is a clean image, y is a clean label, $T_p$ is a backdoor image, and y is a backdoor label.

Evaluate the success rate and clean accuracy of light backdoor attacks using a testing set.

The testing set consists of a set of images (backdoor images and clean images) that have been lighten, darken, and denoise.

The ability of an attacker to assume complete control of the training set and implement the attack using poisoned tags. In addition, the attacker only knows the architecture of the model, but cannot control the internal weights and parameters of the model.

The overall process of this embodiment is shown in FIG. 1, which includes the following three steps: generating backdoor images, training backdoor models, and evaluating backdoor models.

Step 1, generate a backdoor image. Use a flashlight to generate a light trigger on a traffic sign, which includes three different colors: blue, green, and red. Then, use a camera to capture and obtain images. These images are poisoning images, and set all backdoor images as target labels.

Step 2, backdoor model training. Mix backdoor training set and clean training set into the model for training. To verify the impact of the backdoor model on the accuracy of clean data, a clean model was trained using a clean training set (without backdoors) and the same training settings for comparison.

Step 3, Backdoor model evaluation. Evaluate the effectiveness of the trained model. The evaluation is divided into two parts: 1) Evaluating the classification accuracy of the model for a clean testing set. 2) Evaluating the effectiveness of the backdoor attack by calculating the ratio of the testing set of backdoor images incorrectly classified as target labels to the testing set of all backdoor images.

Dataset and Model Structure

The following experimental results are combined with the evaluation of the light backdoor attack method proposed in present disclosure.

The clean dataset used in this embodiment is the CTSRD traffic sign dataset. Considering some classes with fewer images and the impact of low resolution images on the experimental results, this embodiment selected the 20 classes with the highest number of images, while deleting images with resolution heights or widths less than 100 from the dataset. All images are resized to 224×224×3. The image classification model is ResNet-18, ResNet-34, and ResNet-50.

2) Experimental Setup

In the present disclosed image classification experiments, the attack class is no car traffic sign.

Present disclosure uses an SGD optimizer with momentum set to 0.9, initial learning rate is 0.01, training 90 epochs, and learning rate decreasing by a factor of 10 every 30 epochs. The poisoning rate $\alpha$ is 0.02.

3) Experimental Results

Experimental Results on the Effectiveness of the Backdoor Attacks

Considering that the environment is complex in the real world, additional processing (brighten, darken and Gaussian noise) is applied to the testing set for this experiment. This is to simulate the brightness variation of the environment in the real world and the noise that may be introduced when shooting. The evaluation criteria for the effectiveness of the backdoor attack are the attack success rate (ASR) and the clean data accuracy (CDA). The experimental results are shown in the following table:

| Model | Trigger | CDA | Unprocess ASR | Brighten ASR | Darken ASR | Gaussian noise ASR |
|---|---|---|---|---|---|---|
| ResNet-18 | — | 98.96% | — | — | — | — |
| | Blue light | 98.20% | 87.50% | 92.19% | 89.06% | 68.75% |
| | Green light | 98.36% | 100.00% | 96.88% | 98.44% | 96.88% |
| | Red light | 98.52% | 67.19% | 62.50% | 70.31% | 48.44% |
| ResNet-34 | — | 98.22% | — | — | — | — |
| | Blue light | 97.31% | 98.44% | 96.88% | 100.00% | 92.19% |
| | Green light | 97.45% | 100.00% | 98.44% | 100.00% | 96.88% |
| | Red light | 97.50% | 76.56% | 64.06% | 82.81% | 60.94% |
| ResNet-50 | — | 98.96% | — | — | — | — |
| | Blue light | 98.20% | 98.44% | 100.00% | 98.44% | 95.31% |
| | Green light | 98.36% | 100.00% | 100.00% | 100.00% | 98.44% |
| | Red light | 98.52% | 76.56% | 81.25% | 71.88% | 65.63% |

Experimental Results on Backdoor Attacks Stealthiness

Figure 2:
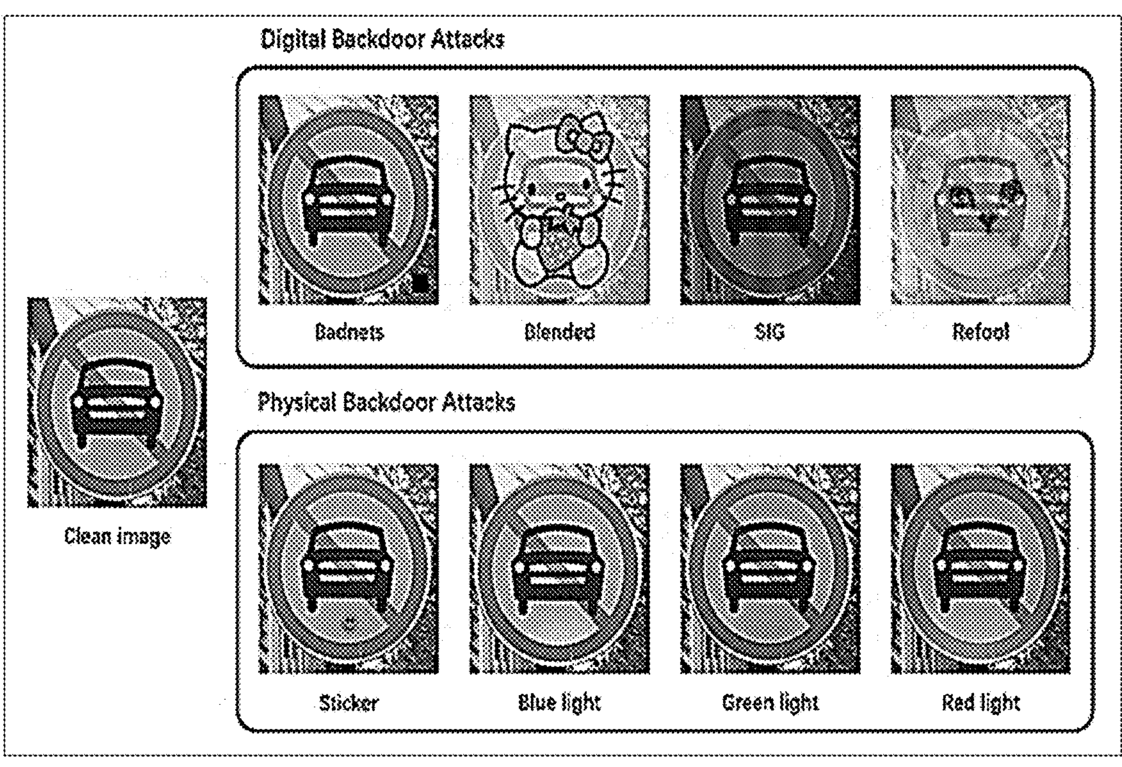
FIG. 2 shows a comparison of the present disclosure with existing backdoor attacks stealthiness.

Present disclosure compares the stealthiness of backdoor attacks in FIG. 2. As can be seen, the images with digital triggers look suspicious. In contrast, physical backdoor attacks are more stealthy. In the hypothesis of the application scenario of the present disclosure, the attacker can initiate the attack when needed, which means that the traffic sign remains clean for a long period of time, which is superior to a sticker trigger that is always stuck to the traffic sign after deployment. In addition, the method of the present disclosure is also better at initiating attacks stealthily compared to sticker triggers, which may be perceived as roadside lights accidentally projected on traffic signs.

Grad-CAM Experimental Results

Figure 3:
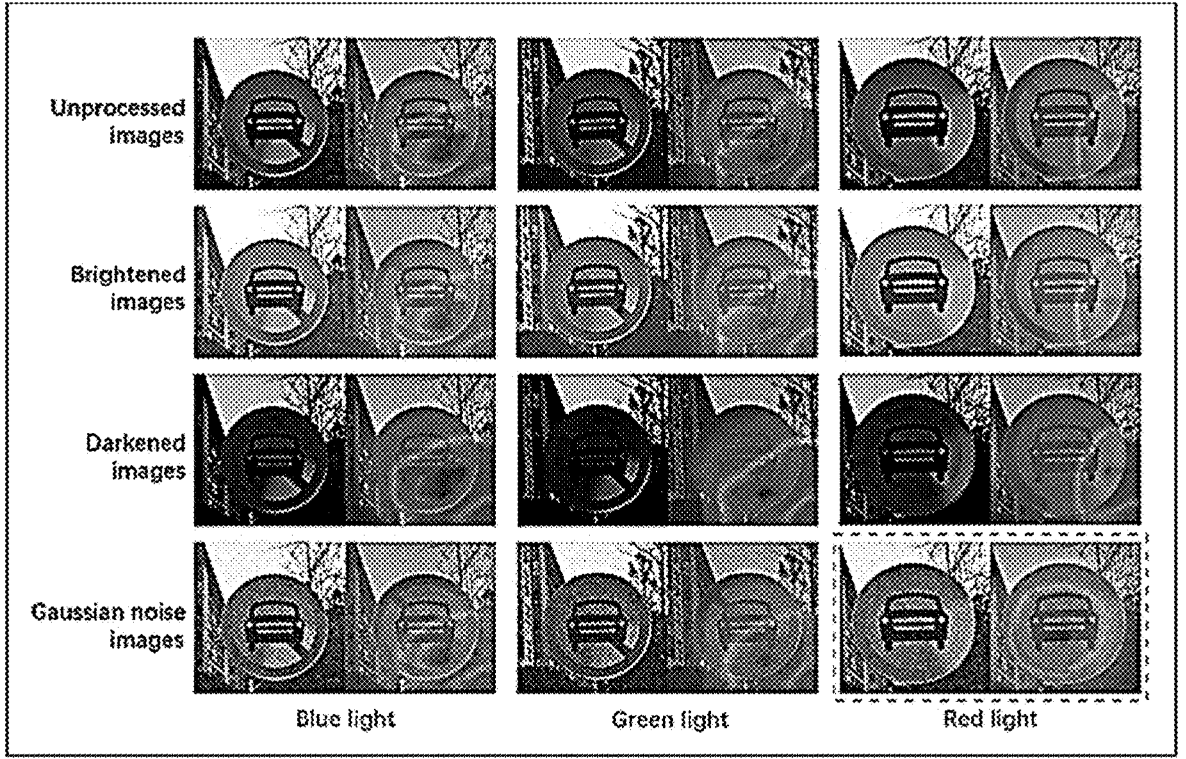
FIG. 3 presents an example of some of the backdoor images of the present disclosure and gradient-weighted class activation map (Grad-CAM) experiments in complex environments.

Grad-CAM visualizes the prediction process of DNNs through heat maps, which helps to observe the focus area of the model during the inference stage. As shown in FIG. 3, some examples of the backdoor images of the present disclosure are visualized using Grad-CAM. It can be found that the backdoor model ignores the original task of the backdoor image and focuses on the backdoor trigger.

Evaluate the Other Test Classes Experimental Results

Present disclosure additionally evaluates the backdoor images of "no left turn traffic sign" and "no horn traffic sign" using the previously trained backdoor model.

Figure 4:
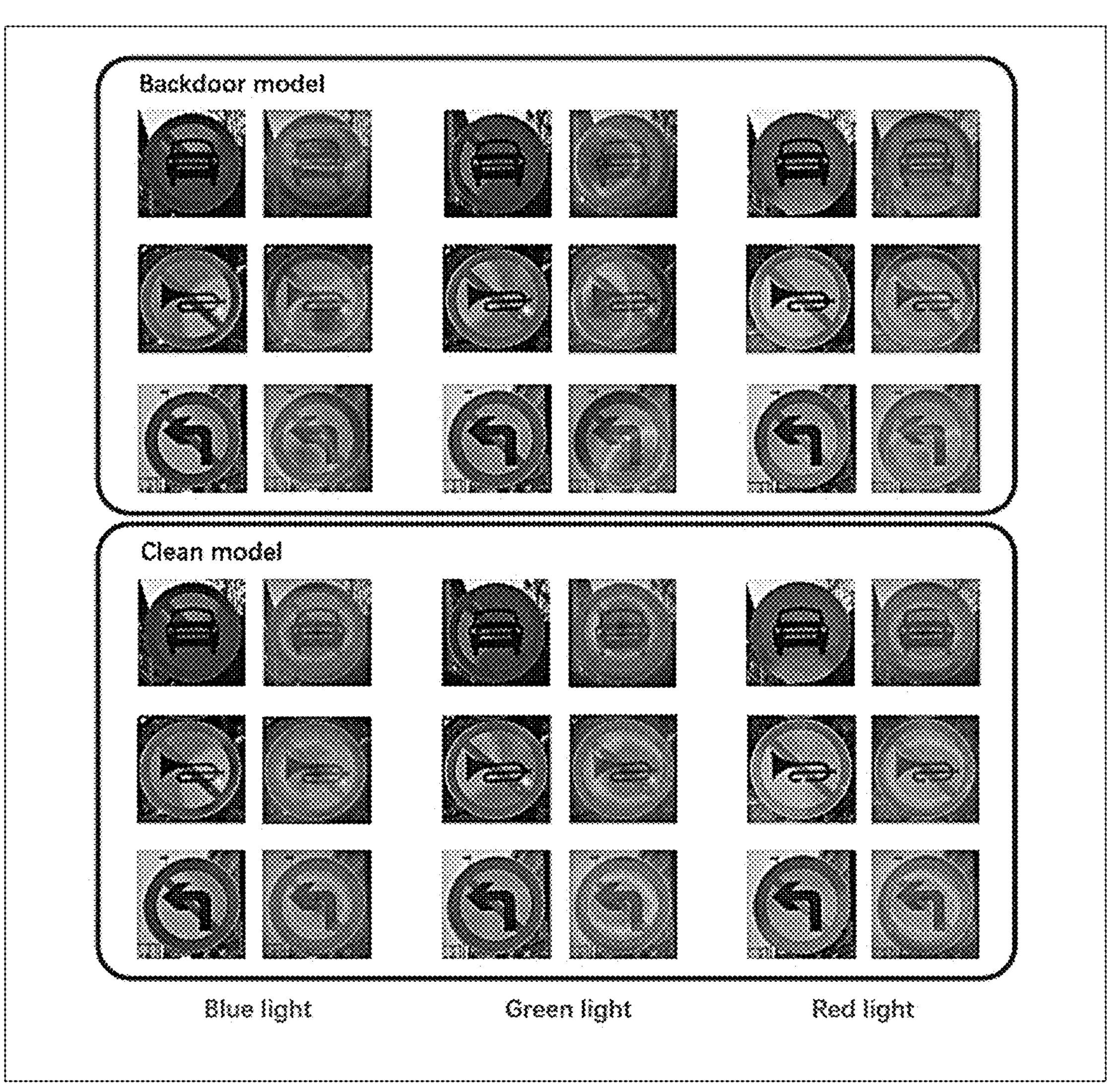
FIG. 4 presents experimental results of the present disclosure evaluating other traffic sign test classes.

Present disclosure shows the focal regions of the three classes of backdoor images in the backdoor model and the clean model using the Grad-CAM visualization in FIG. 4. It can be seen that the backdoor model focuses mainly on the light triggers, which means that the backdoor model successfully attacks the three classes of backdoor images, while the clean model remains focused on the original task of the images. This implies that the trained backdoor model is effective in attacking other classes of backdoor images as well.

Backdoor Defense Experimental Results

Resist to Data Enhancement

Figure 5:
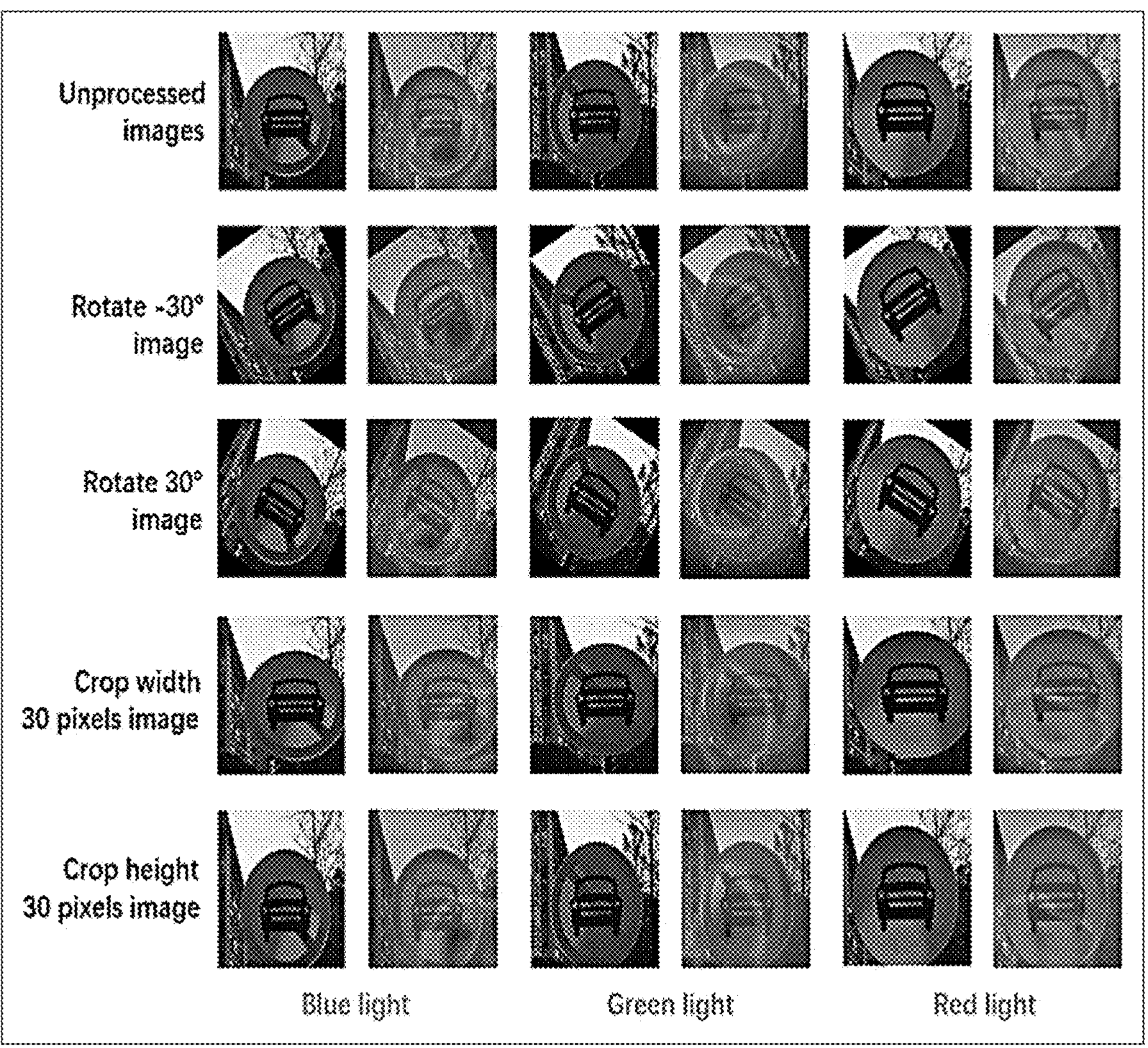
FIG. 5 presents experimental results of the present disclosure resist to data enhancement defenses.
Figure 6:
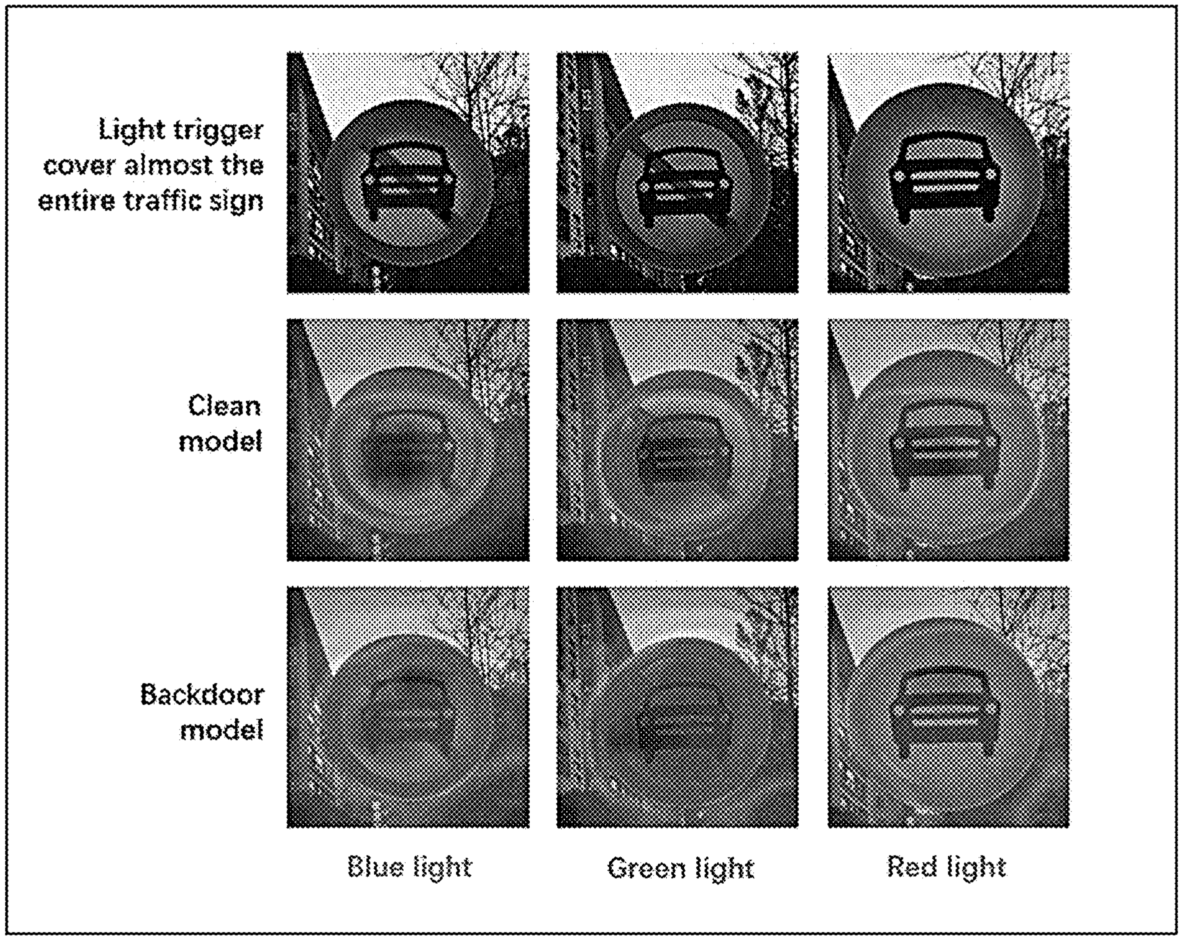
FIG. 6 presents experimental results of the present disclosure resist to Grad-CAM defense.

Present disclosure verifies whether data enhancement can resist the light backdoor attack by rotating the backdoor image by 30° and cropping it randomly (cropping the image height or width by 30 pixels and reshaping the image to 224×224×3). The effect of the attack on the backdoor image after data enhancement is shown in FIG. 5, where it can be seen that the light backdoor attack is not affected by the data enhancement. The backdoor image is still misclassified due to the fact that the light trigger is mainly focused on the target object and is not a static trigger pattern. Therefore, the light triggers are hardly corrupted by rotation and random cropping. This means that light backdoor attacks are resistant to data augmentation.

Resist to Grad-CAM

Using Grad-CAM to generate heat maps can be used to capture the triggers in the backdoor images. Although it was shown in previous experiments that this method can capture some light backdoor images, however this can be circumvented by increasing the area of the light triggers. Present disclosure project lights on traffic signs to fully cover them and obtain backdoor images. And then, present disclosure evaluate these backdoor images using the clean model and the backdoor model. As shown in the FIG. 6, when the light triggers almost cover the entire traffic signs, the attention of the backdoor image in the clean model and the backdoor model are mainly focused on the traffic signs. The focal area of the heat map of the backdoor images in the backdoor model is only slightly larger, which is not enough to capture the backdoor trigger effectively.

The above is only the preferred specific implementation method of this application, but the scope of protection of this application is not limited to this. Any changes or replacements that can be easily thought of by technical personnel familiar with the technical field within the scope of disclosure in this application should be covered within the scope of protection of this application. Therefore, the protection scope of this application should be based on the protection scope of the claims.

What is claimed is:

1. A light backdoor attack method for a physical world, comprising:

generating, by a flashlight, a light trigger on a traffic sign;

capturing and acquiring, by a camera, a backdoor training set $X_b$, and marking all images in the backdoor training set $X_b$ as a target label;

constructing a training set $X_p$ according to the backdoor training set $X_b$ and a clean training set $X_c$, wherein $X_p=X_b \cup X_c$, and a backdoor image $T_p$ in the backdoor training set $X_b$ is defined as $T_p(x_i,t_p,m_i)=(1-m_i)\cdot x_i+m_i\cdot t_p$, where $t_p$ represents a backdoor trigger, $x_b$ represents a clean image, $m_i$ represents a ratio of the backdoor trigger to the backdoor image, and $m_i \in [0,1]$;

training a backdoor model using the training set $X_p$ to obtain a trained backdoor model $f_\theta$, wherein $f_\theta(x)=y$, $f_\theta(T_p)=y'$, where x represents a clean image, y represents a clean label, $T_p$ represents the backdoor image, and y' represent a backdoor label;

using the trained backdoor model $f_\theta$ to classify a target traffic sign image captured by the camera to thereby obtain a classification result; and in response to that the classification result is that the target traffic sign image corresponds to the backdoor label, determining that the target traffic sign image is a potential security threat for achieving recognition of security threats.

2. The light backdoor attack method for the physical world according to claim 1, wherein the light trigger comprises three different colors: blue, green, and red.

3. The light backdoor attack method for the physical world according to claim 1, wherein the target label indicates that an attacker wants to backdoor attack the images with the target label, and a label corresponding to a source class is a source label.

4. The light backdoor attack method for the physical world according to claim 1, wherein an image poisoning rate $\alpha$ of the training set $X_p$ is 0.02, and the backdoor training set accounts for 2% of the entire training set $X_p$.

5. The light backdoor attack method for the physical world according to claim 1, further comprising:

in response to that the classification result is that the target traffic sign image corresponds to the backdoor label, generating, by a processor, a warning signal to a control system of a vehicle to indicate a potential security threat from physical light backdoor attack, to avoid a vision-based system of the vehicle from being compromised by the physical light backdoor attack on the target traffic sign image.

6. A light backdoor attack method for a physical world, comprising:

generating, by a flashlight, a light trigger on a traffic sign;

capturing and acquiring, by a camera, a backdoor training set $X_b$, and marking all images in the backdoor training set $X_b$ as a target label;

constructing a training set $X_p$ according to the backdoor training set $X_b$ and a clean training set $X_c$, wherein $X_p=X_b \cup X_c$, and a backdoor image $T_p$ in the backdoor training set $X_b$ is defined as $T_p(x_i,t_p,m_i)=(1-m_i)\cdot x_i+m_i\cdot t_p$, where $t_p$ represents a backdoor trigger, $x_i$ represents a clean image, $m_i$ represents a ratio of the backdoor trigger to the backdoor image, and $m_i \in [0,1]$;

training a backdoor model using the training set $X_p$ to obtain a trained backdoor model $f_\theta$, wherein $f_\theta(x)=y$, $f_\theta(T_p)=y'$, where x represents a clean image, y represents a clean label, $T_p$ represents the backdoor image, and y' represent a backdoor label;

using the trained backdoor model $f_\theta$ to classify a target traffic sign image captured by the camera to thereby obtain a classification result; and in response to that the classification result is that the target traffic sign image corresponds to the backdoor label, generating an output indicating that the target traffic sign image is a potential security threat to a deep neural network (DNN) for achieving recognition of security threats.

* * * * *